US009460434B1

(12) United States Patent
Daniel (10) Patent No.: US 9,460,434 B1
(45) Date of Patent: Oct. 4, 2016

(54) SYSTEM AND METHOD OF TRANSFERRING DATA MINUTES

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 14/728,885

(22) Filed: Jun. 2, 2015

Related U.S. Application Data

(60) Provisional application No. 62/006,707, filed on Jun. 2, 2014.

(51) Int. Cl.
*G06Q 20/06* (2012.01)
*G06Q 20/38* (2012.01)
*H04W 8/00* (2009.01)
*H04M 15/00* (2006.01)

(52) U.S. Cl.
CPC ............ *G06Q 20/381* (2013.01); *G06Q 20/06* (2013.01); *H04M 15/41* (2013.01); *H04W 8/005* (2013.01)

(58) Field of Classification Search
CPC ...................................................... H04W 4/24
See application file for complete search history.

(56) References Cited

U.S. PATENT DOCUMENTS

2013/0232048 A1* 9/2013 Corner ............... G06Q 20/3223
705/37
2014/0129457 A1* 5/2014 Peeler .................. G06Q 30/018
705/317

* cited by examiner

*Primary Examiner* — Michael T Vu
(74) *Attorney, Agent, or Firm* — Carol N. Green Kaul, Esq.

(57) ABSTRACT

The present disclosure relates generally to systems, computer-implemented methods and computer program product of enabling the transfer of mobile currency between mobile device(s) exchanged for cash with dealers who rent out phones, or bartered for goods and services. The contemplated invention, inter alia, enables transfer of mobile currency either directly between mobile devices or use of a data transfer facility or center for the transfer using a communications network.

18 Claims, 5 Drawing Sheets

MINIT DASHBOARD — 300

| Customer Account | Minutes Deposited | Conversion in Currency (Domestic) | Conversion to Roaming Minutes | Choose Country |
|---|---|---|---|---|
| 305-000-1111 | 5,000 | $25.00 | 500 | Nigeria |
| 123-456-7891 | 10,000 | $50.00 | 1,000 | Egypt |
| 212-123-4567 | 15,000 | $75.00 | 1,500 | South Africa |

FIG. 3

MINIT DATA DASHBOARD — 400

| Customer Account | Data Deposited | Conversion in Currency (Domestic) | Conversion to International Data Rates | Choose Country | Minutes Used |
|---|---|---|---|---|---|
| 305-000-1111 | 50 MB. | $1.25 | $1.69 | Nigeria | |
| 123-456-7891 | 500 MB. | $12.50 | $16.25 | Egypt | |
| 212-123-4567 | 1 GB. | $25.00 | $32.50 | South Africa | |

SYSTEM AND METHOD OF TRANSFERRING DATA MINUTES

PRIORITY CLAIM

This patent application is a Non-Provisional patent application and claims priority under 35 U.S.C. §119(e) to U.S. Provisional Patent Application Ser. No. 62/006,707, titled "System And Method Of Transferring Data Minutes" filed Jun. 2, 2014; and U.S. Non-Provisional patent application Ser. No. 14/719,191, titled "System And Method For Secure Payment Processing Using Subscriber Identity Module Cards" filed May 21, 2015. The entire disclosures of the afore-mentioned patent applications are incorporated by reference as if fully stated herein.

SUMMARY OF THE INVENTION

Mobile currency that allows pre-paid mobile-airtime minutes as a de facto currency that can be transferred between phones, exchanged for cash with dealers who rent out phones, or bartered for goods and services only seems to be gaining in popularity. Although some governments are skeptical that continued use cannot be sustained as it will erode economic viability, the ease and convenience of use while fulfilling a need only adds to its popularity. However, at the genesis of any of these transactions, there is still a requirement for payment of the minutes with some form of monetary currency, i.e. cash or credit cards.

In some remote areas access to a bank is very limited making it impractical to travel to a bank to obtain cash to replenish one's mobile currency. Thus, even if a friend or relative wants to share minutes, coordinating the transaction for legal tender of monetary currency may require both parties to travel to a remote location to access a bank. Thus there needs to be an easy, expedient way of transferring mobile currency between two current account holders.

This invention satisfies this long felt need in a new and novel manner. For a further and more fully detailed understanding of the present invention, various objects and advantages thereof, reference is made to the following detailed description and the accompanying drawings. Additional objectives of the present invention will appear as the description proceeds Aspects of embodiments of the present invention contemplate a system for the transfer of mobile currency, where the system may include server(s), a communications network in communication with the server(s), mobile device(s) in communication with the server(s), where the communication may be via the communications network, a conversion module in communication with the server(s), where the conversion module may be configured to convert minutes into currency and currency into minutes. In another aspect of an embodiment of the present invention, the conversion module may also be configured to determine applicable minute conversion rates. The system may also include, one or more database(s), in communication with the server(s), where the database(s) may be configured to maintain accounts or records for user(s) of the mobile device(s), and computer execution code, executable by the server(s), for operations of the system server(s) and the system modules.

An aspect of an embodiment of the present invention may include an access module for providing user access to user accounts. In one aspect, the access module may be configured to determine whether a user has an account with the system.

An aspect of an embodiment of the present invention contemplates the mobile device(s) having a conversion application. In one aspect, this application may enable the mobile device(s) user to convert his/her minutes to currency or, alternatively, convert currency into minutes locally (on the mobile device(s)) without requiring data conversion by the system server(s).

An aspect of an embodiment of the present invention contemplates the mobile device(s) having a communication module for communicating with other electronic devices and the one or more sever.

An aspect of an embodiment of the present invention contemplates the mobile device(s) having a detection module for detecting the presence of other compatible electronic devices for transfer of mobile currency. A user of one of the mobile devices may then be able to transfer currency and/or minutes among compatible devices.

Another aspect of an embodiment of the present invention contemplates a computer-implemented method for the transfer of mobile currency, where the method may include executing on a processor the steps of: establishing communication between mobile device(s) and server(s), converting mobile minutes of the mobile device(s) into currency, converting currency into mobile minutes of the mobile device(s), determining applicable minute conversion rates, maintaining records for the mobile device(s), and execution of computer execution code, executable for operation of the server(s) and the mobile device(s).

In another aspect of an embodiment of the present invention the computer-implemented method may further include the step of providing access to user accounts.

In another aspect of an embodiment of the present invention the computer-implemented method may further include the step of determining whether a user has an account within the server(s)

In another aspect of an embodiment of the present invention the computer-implemented method may further include the step of enabling communication between the mobile device(s).

In another aspect of an embodiment of the present invention the computer-implemented method may further include the step of launching a conversion application on the mobile device(s).

In another aspect of an embodiment of the present invention the computer-implemented method may further include the step of detecting compatible devices among the mobile device(s).

A yet further aspect of an embodiment of the present invention contemplates computer program product which may include a computer usable medium having control logic stored therein for causing a computer processor to enable the transfer of mobile currency, where the control logic may include computer readable program code for: establishing communication between mobile device(s) and server(s), converting mobile minutes of the mobile device(s) into currency, for converting currency into mobile minutes of the mobile device(s), for determining applicable minute conversion rates, for maintaining records for the mobile device(s), and for operation of the server(s) and the mobile device(s).

In a further aspect of an embodiment of the present invention, the computer program product may further include computer readable program code for providing access to user accounts.

In a further aspect of an embodiment of the present invention, the computer program product may further include computer readable program code for determining whether a user has an account within the server(s)

In a further aspect of an embodiment of the present invention, the computer program product may further include computer readable program code for enabling communication between the mobile device(s).

In a further aspect of an embodiment of the present invention, the computer program product may further include computer readable program code for launching a conversion application on the mobile device(s).

In a further aspect of an embodiment of the present invention, the computer program product may further include computer readable program code for detecting compatible devices among the mobile device(s).

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Figure 1:
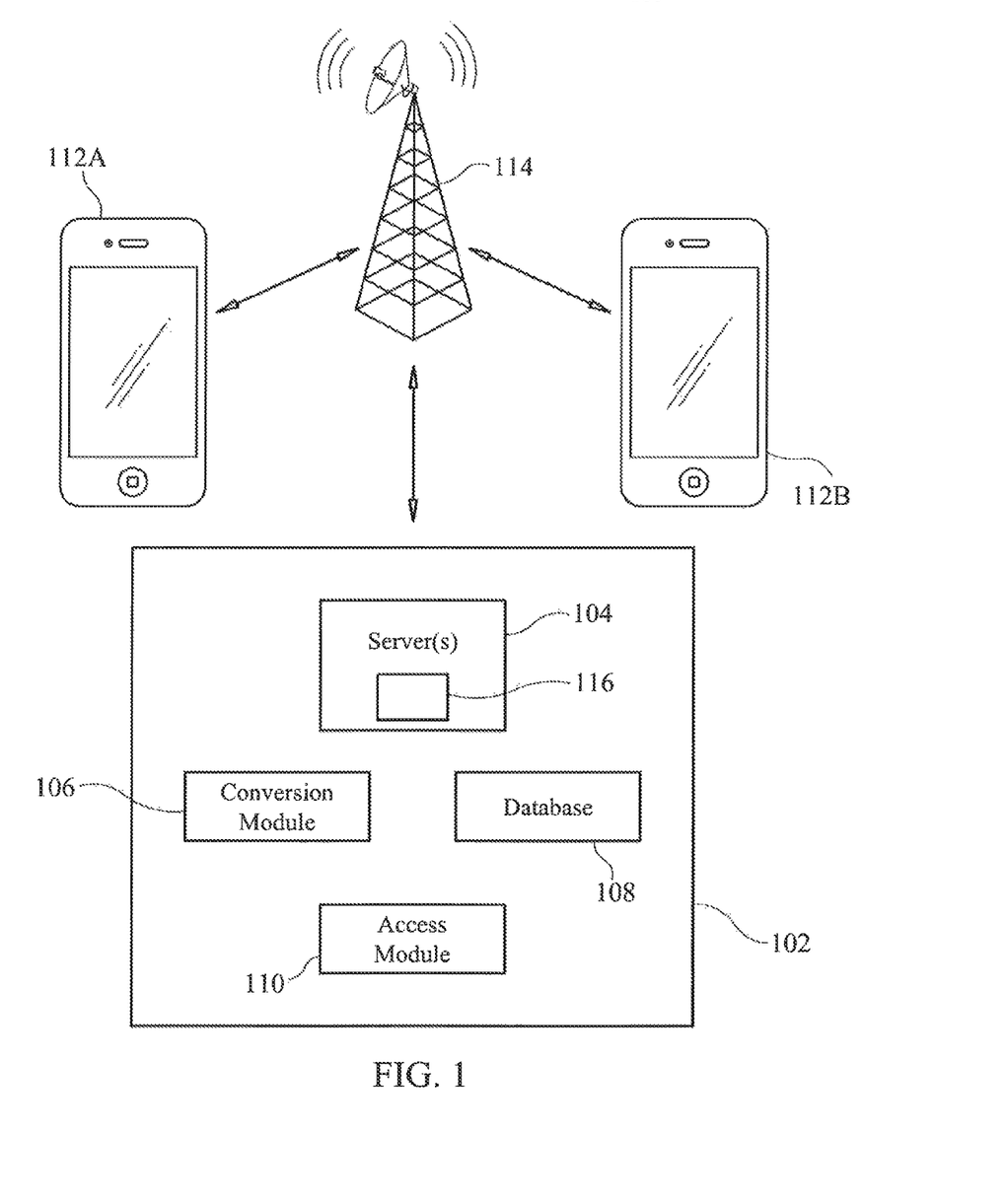
FIG. 1 illustrates an exemplary system according to an aspect of an embodiment of the present invention.
Figure 2A:
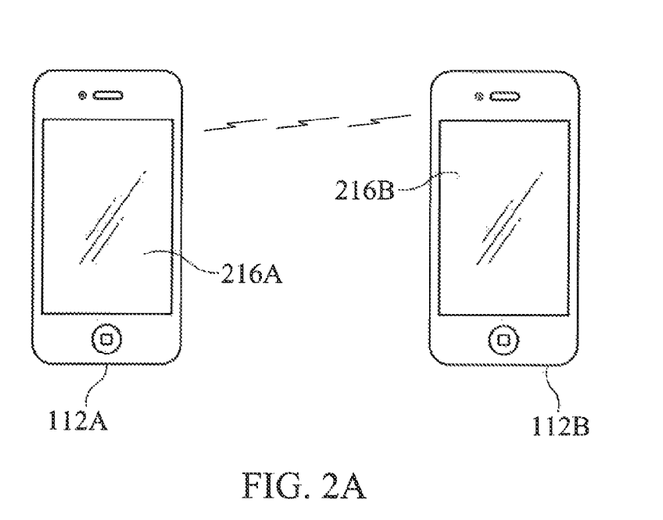
FIG. 2A illustrates an exemplary data transfer process between mobile devices according to an aspect of an embodiment of the present invention.
Figure 2B:
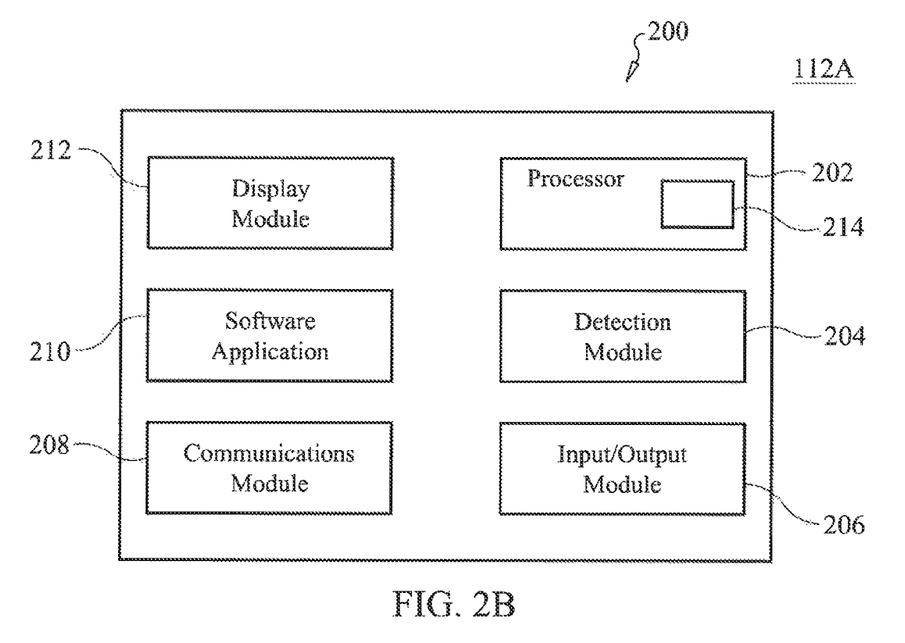
FIG. 2B illustrates an exemplary layout of the components of a mobile device according to an aspect of an embodiment of the present invention.

Referring now to FIG. 1, an exemplary system 100 according to an aspect of an embodiment of the present invention is shown. System 100 may include data transfer center 102 where members of the system may access their accounts and transfer minutes, currency and/or mobile currency to another member. System 100 may also include mobile device(s) 112A and 112B (while only two devices are shown, aspects of embodiments of the resent invention contemplate more mobile device(s)). Mobile device(s) 112A and 112B may be any type of device configured to communicate wirelessly and/or wired with other devices, such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

System 100 may also include communications network 114 which enables communication between mobile device(s) 112A and 112B, and data transfer center 102. Data transfer center 102 may include one or more server(s) 104, conversion module 106, database 108 and access module 110. Server(s) 104 may, in one aspect of an embodiment of the present invention, include a main server which conducts or controls all the operations of data transfer center 102. Server(s) 104 may also, in another aspect of an embodiment of the present invention, by in communication with some or all of the other components of data transfer center 102.

Conversion module 106 may be configured to convert a user's minutes into currency and/or convert currency into minutes. Conversion module 106 may have its own server (not shown), and/or computer executable code for performing all of its functions. In one aspect of an embodiment of the present invention, some or all of conversion module 106's processing may be done by server(s) 104. In another aspect of an embodiment of the present invention, some or all of conversion module 106's processing may be done by a local conversion module server (not shown).

Data transfer center 102 may include database 108 which, in one aspect of an embodiment of the present invention, may be used to maintain accounts of system 100's members/users and also maintain records for system 100's users. Access module 110, another component of data transfer center 102, enables user access to system 100. Members/users of system 100 may gain access to their accounts by having access module 110 enable such activity. Access module 110, in one aspect of an embodiment of the present invention, may be responsible for verifying the identification of individuals who sign in or attempt to sign in to the sign and provide access to data transfer center 102 to members of the system 100.

Referring now to FIGS. 2A & 2B through FIG. 4, an exemplary data transfer process between mobile devices 112A and 112B, an exemplary layout 200 of the components of mobile device 112A and exemplary dashboards 300 and 400 according to aspects of embodiments of the present invention are shown. It should be noted that this component layout 200 may, in aspects of embodiments of the present invention, be typical of mobile devices contemplated in the present invention. Here, the user of mobile device 112A, having registered his/her device with system 100 may then be able to transfer minutes or currency to another mobile device 112B user. First, mobile device 112A may have a processor 202 which enables processing of data input/output, operations etc. of mobile device 112A. Mobile device 112A may also include a detection module 204 which may enable the user of mobile device 112A to determine whether another compatible mobile device is in the vicinity, or to determine whether the user of mobile device 112B is a member (as is user of mobile device 112A) of system 100. Detection module 204 may employ a number of software and hardware to determine whether a signal sent and received from mobile device 112B indicates mobile device 112B's registration with system 100 an input/output module 206 of mobile device 112A enables the user of mobile device 112A to navigate mobile device 112A and also to navigate dashboard 300 shown in FIG. 3. Dashboard 300 may be displayed at data transfer center 102 or in another aspect of an embodiment of the present invention, shown on a display 216A of mobile device 112A. This may be made possible by display module 212 of mobile device 112A which uses computer executable code to enable the display of the dashboard as generated on the mobile device 112A by launch and operation of software application 210 or by enabling display of communication received from data transfer center 102 via communications module 208 of mobile device 112A. The dashboard information may be generated locally (as discussed above) or may be generated at data transfer center 102 and then sent via communications network 114 to mobile device 112A.

Figure 3:
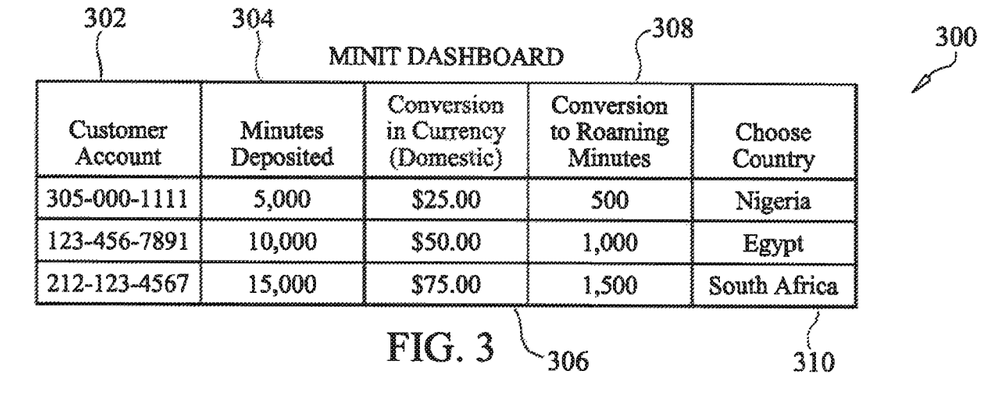
FIG. 3 illustrates an exemplary dashboard according to an aspect of an embodiment of the present invention.

Dashboard 300 shows the user's account information including the customer account number 302, minutes deposited in the member's account 304, the current conversion of the minutes 306, the conversion to roaming minutes 308 and the country listing 310 to which or from which the user of mobile device 112A wishes to send or receive mobile currency from.

The user of mobile device 112A may register his/her telephone numbers (in this aspect, mobile device 112A may be a mobile phone) with system 100 and may be able to purchase minutes and monitor his/her minutes' usage. In some aspects of embodiments of the present invention, system 100 may include a software application at data transfer center 102 or in another aspect at mobile device 112A (as component 210). The software application may enable a user to access dashboard 300 and transfer minutes to another member by having both phones 112A and 112B touching each other using peer to peer connectivity to transfer the minutes while they are directly connected. In some aspects of embodiments of the present invention, a user by using a few keystrokes and/or for example tapping (both being enabled by input/output module 206) the mobile application on the phone with both phones touching, the minutes are transferred to the receiving phone.

Figure 4:
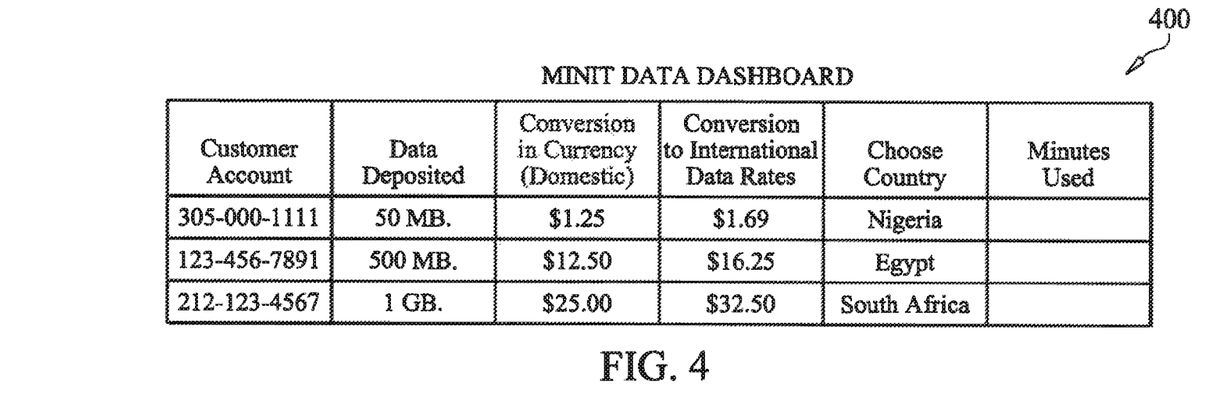
FIG. 4 illustrates another exemplary dashboard according to an aspect of an embodiment of the present invention.

In some aspects of embodiments of the present invention, mobile application 210 may include data transfer capabilities, where the user of mobile device 112A may use mobile application 210 to transfer data to another customer (user of 112B) where the transfer rate for the files depends on the size of the file and it is calculated and converted into currency, (domestic or international currency) as illustrated in dashboard 400 of FIG. 4. Once the currency is determined, then system 100 may convert the calculated cost into mobile currency (minutes) and the minutes are appropriately deducted from the member's account. In this manner, data files can be transferred through the cellular network system, without the necessity of having to subscribe to an Internet provider service. In some embodiments, roaming rates may apply. This is especially important in rural areas where the phones communicate through satellite networks and cellular towers but Internet service is spotty and/or unavailable.

Just as authorized merchants accept Visa/MasterCard, American Express or any other debit, credit and/or payment card, a merchant member of system 100 may use his/her mobile device 112A or 112B to accept payment from a user using his/her mobile device with mobile minutes as legal tender for purchases. The authorized merchant may use his/her payment systems, dedicated phone or tablet to operate the services described herein. Authentication procedures to ensure that the purchaser has sufficient minutes to make a purchase would follow the same process as currently exists for merchants authorizing payment cards.

In some embodiments, the authorized merchant receiving mobile currency for payment may use dashboards 300 and/or 400 to manage his/her mobile currency, and by transferring the mobile currency it is converted to monetary currency that is now deposited with the mobile currency bank.

Figure 5:
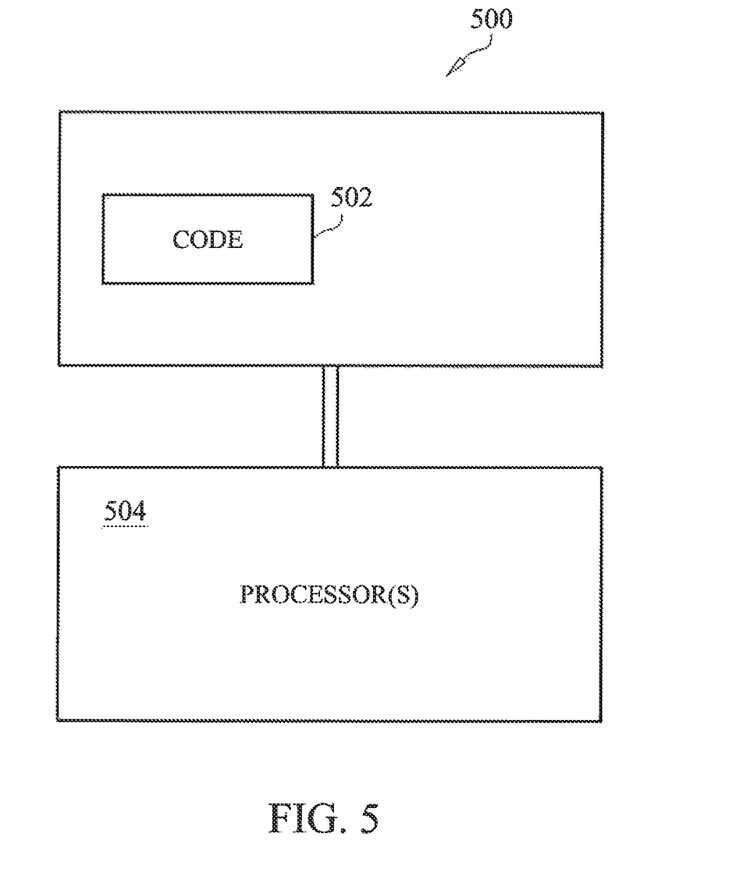
FIG. 5 illustrates an exemplary block diagram depicting a non-transitory computer readable medium according to an aspect of an embodiment of the present invention.

Referring now to FIG. 5, an exemplary block diagram depicting a non-transitory computer readable medium 500 according to an aspect of an embodiment of the present invention is shown. Here, computer readable medium 500 may comprise computer executable instructions 502 readable by at least one processor 504 and operative to perform any or all of the following steps or functions, for example: establishing communication between mobile device(s) 112A and/or 112B and server(s) 104, converting mobile minutes of mobile device(s) 112A and/or 112B into currency, converting currency into mobile minutes mobile device(s) 112A and/or 112B, determining applicable minute conversion rates, maintaining records at database 109 for mobile device(s) 112A and/or 112B and execution of computer execution code 116, executable for operation of server(s) 104, mobile device(s) 112A and/or 112B and/or the various functions otherwise listed herein.

In some aspects of embodiments of the present invention, processor(s) 504 may be part of or integrated into a mobile device 112A and/or 112B. In one aspect, computer executable instructions 502 may be stored, in whole or in part, remotely, such as in a server or central station, or locally, such as in the mobile device 112A and/or 112B. In some aspects, the central station may comprise any type of central station, such as data transfer center 102.

Non-transitory computer readable medium 500 may comprise any type non-transitory computer readable medium, such as, but not limited to, a hard drive, a flash drive, a solid state drive, computer memory, a compact disc, a DVD, and the like. Computer readable medium 600 may comprise any of the various embodiments described herein, such as those described with reference to FIGS. 1 through 4.

In some embodiments, computer executable instructions 502 may comprise the various embodiments of computer executable instructions described herein, such as those described above with reference to FIGS. 1-4. Computer executable instructions 502 may be part of, used in, or be included in the various systems and methods described herein.

In aspect(s) of embodiment(s) of the present invention, a software program may be launched from a computer readable medium in computer-based systems to execute the functions defined in the present invention. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Hardware and Operating Environment

This section provides an overview of example hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement the system 100 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
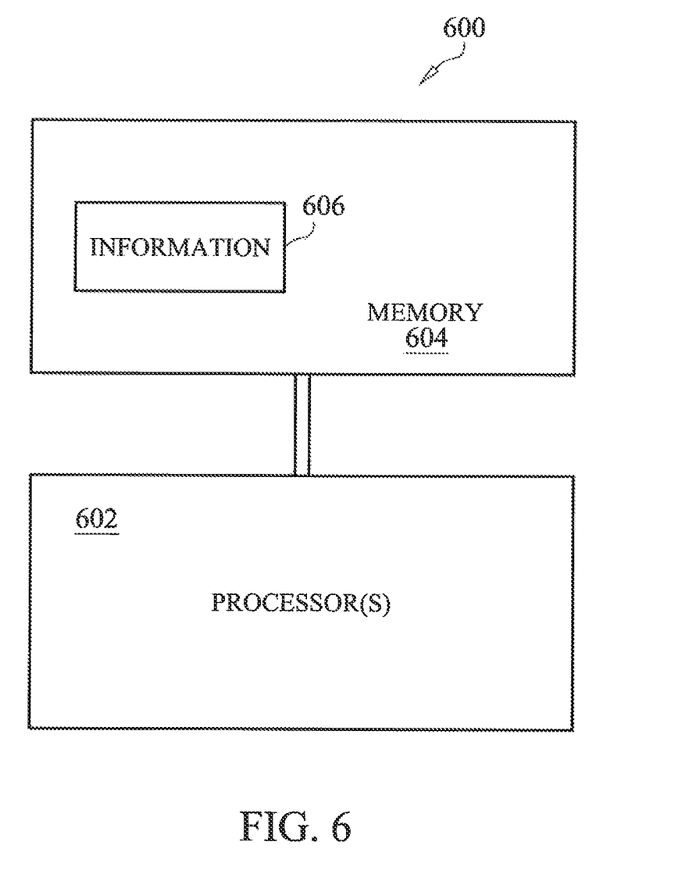
FIG. 6 illustrates a block diagram representing an apparatus according to an aspect of an embodiment of the present invention.

Referring now to FIG. 6 a block diagram representing an apparatus 600 according to an aspect of embodiments of the present invention is shown. Such aspects may comprise a computer, a memory system, a magnetic or optical disk, some other storage device, or any type of electronic device or system. Apparatus 600 may include processor(s) 604 coupled to a machine-accessible medium such as memory 606 (e.g., a memory including electrical, optical, or electromagnetic elements). The medium may contain associated information 606 (e.g., computer program instructions, data, or both) which, when accessed, results in a machine (e.g., the processor(s) 604) performing the activities previously described herein.

In an aspect of an embodiment of the present invention, the term "module" may represent self-contained computer hardware. In another aspect of an embodiment of the present invention, the term "module" may represent computer hardware on a designated computer chip or separate computer chips. In yet another aspect of an embodiment of the present invention, the server(s) may be configured to perform tasks not undertaken by the module(s) disclosed herein. In a further aspect of an embodiment of the present invention, the modules may be hardware resident on one chip, component, separate components, a remote server, database, server(s) some or each of which (or all of which, in one aspect of an embodiment of the present invention) may be separate and distinct from the system, or any combination thereof. In one aspect of an embodiment of the present invention, the processor may be configured to coordinate, implement and/or assign tasks to, from and/or among the module(s). In a further aspect of an embodiment of the present invention, "module" may represent operational cooperation between system components. For instance, a display module may comprise of a system processor, a display screen, memory, computer executable instructions executable by the processor and resident within memory location(s) etc. with each component being in communication with one or more other components in the module and each component working with the other component(s) to conduct the desired operation for which the module is configured to do e.g. display of content within memory. In a further aspect of an embodiment of the present invention, module components may also, in an operational context, be components of other modules. For instance a processor in a display module may also be engaged by an input module to help analyze data received via the input module.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for the transfer of mobile currency, the system comprising:
   at least one server;
   a communications network in communication with the at least one server;
   at least one mobile device in communication with the at least one server, wherein communication is via the communications network,
   a detection module enabled for detecting presence of another member's at least one compatible electronic device within nearby vicinity;
   a conversion module in communication with the at least one server, wherein the conversion module is configured to convert minutes into currency and currency into minutes, wherein the conversion module is configured to determine applicable minute conversion rates;
   a software application enabled for transferring minutes from the at least one mobile device to the other member's compatible electronic device while they are directly connected and both devices are touching each other;
   at least one database, in communication with the at least one server, the database being configured to maintain accounts or records for user(s) of the at least one mobile device; and
   computer execution code, executable by the at least one server, for operations of the system at least one server and the system modules.

2. The system of claim 1 further comprising an access module for providing user access to user accounts.

3. The system of claim 2, wherein the access module is configured to determine whether a user has an account with the system.

4. The system of claim 1 wherein transferring minutes further comprises using keystrokes and/or tapping the mobile application on the at least one mobile device with both devices touching, the minutes are transferred to the receiving electronic device.

5. The system of claim 1, wherein the at least one mobile device comprises of a communication module for communicating with other electronic devices and the at least one sever.

6. The system of claim 1, wherein the further comprising the detection module enabled for determining whether the other member has an account with the system.

7. A computer-implemented method for the transfer of mobile currency, comprising executing on a processor the steps of:
    establishing communication between at least one mobile device and at least one server;
    converting mobile minutes of the at least one mobile device into currency;
    converting currency into mobile minutes of the at least one mobile device;
    determining applicable minute conversion rates;
    detecting presence of another member's at least one compatible electronic device within nearby vicinity;
    transferring minutes from the at least one mobile device to the other member's compatible electronic device while they are directly connected and both devices are touching each other;
    maintaining records for the at least one mobile device; and
    execution of computer execution code, executable for operation of the at least one server and the at least one mobile device.

8. The computer-implemented method of claim 7 further comprising the step of providing access to user accounts.

9. The computer-implemented method of claim 7 further comprising the step of determining whether a user has an account within the at least one server.

10. The computer-implemented method of claim 7 further comprising the step of enabling communication between the at least one mobile device and the at least one compatible electronic device.

11. The computer-implemented method of claim 7 further comprising the step of transferring minutes to the receiving electronic device using keystrokes and/or tapping the mobile application on the at least one mobile device with both devices touching.

12. The computer-implemented method of claim 7 further comprising the step of determining whether the other member has an account with the system.

13. A computer program product comprising a non-transitory computer usable medium having control logic stored therein for causing a computer processor to enable the transfer of mobile currency, said control logic comprising:
    computer readable program code for establishing communication between at least one mobile device and at least one server;
    computer readable program code for converting mobile minutes of the at least one mobile device into currency;
    computer readable program code for converting currency into mobile minutes of the at least one mobile device;
    computer readable program code for determining applicable minute conversion rates;
    computer readable program code for detecting presence of another member's at least one compatible electronic device within nearby vicinity;
    computer readable program code for transferring minutes from the at least one mobile device to the other member's compatible electronic device while they are directly connected and both devices are touching each other;
    computer readable program code for maintaining records for the at least one mobile device; and
    computer readable program code for operation of the at least one server and the at least one mobile device.

14. The computer program product of claim 13, further comprising computer readable program code for providing access to user accounts.

15. The computer program product of claim 13, further comprising computer readable program code for determining whether a user has an account within the at least one server.

16. The computer program product of claim 13, further comprising computer readable program code for enabling communication between the at least one mobile device and the at least one compatible electronic device.

17. The computer program product of claim 13, further comprising computer readable program code for transferring minutes to the receiving electronic device using keystrokes and/or tapping the mobile application on the at least one mobile device with both devices touching.

18. The computer program product of claim 13, further comprising computer readable program code for determining whether the other member has an account with the system.

* * * * *